Feb. 5, 1963  W. L. MORGAN  3,076,324
PRODUCTION OF COATED FIBERS
Original Filed Dec. 31, 1956
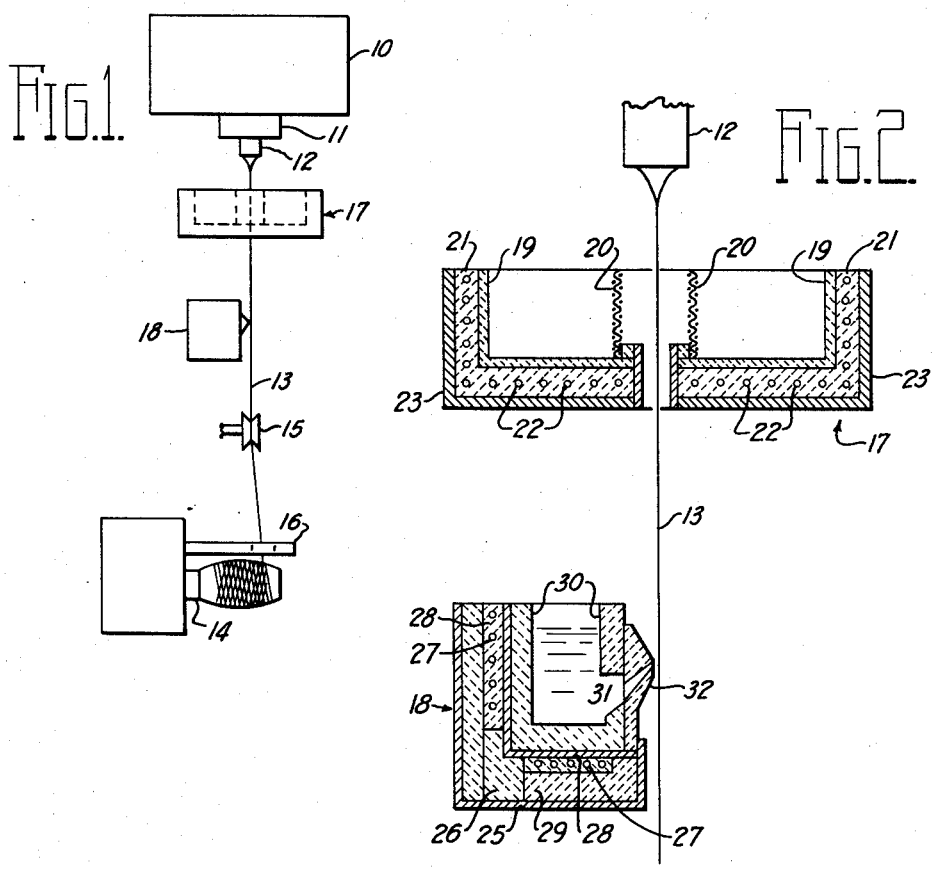
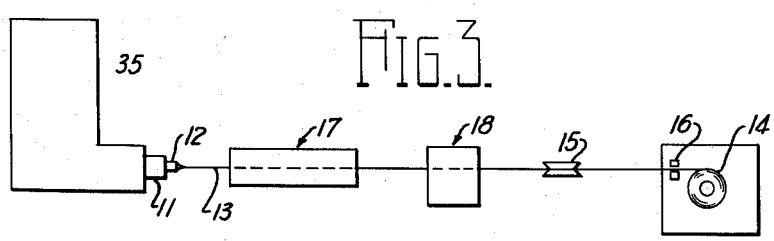
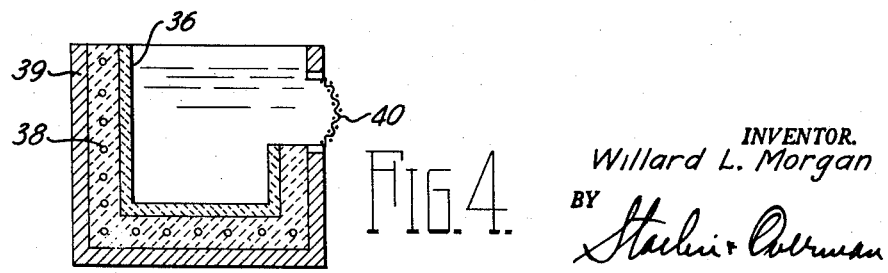
INVENTOR.
Willard L. Morgan
BY
ATTORNEYS United States Patent Office 3,076,324
Patented Feb. 5, 1963

3,076,324
PRODUCTION OF COATED FIBERS
Willard L. Morgan, Newark, Ohio, assignor to Owens-Corning Fiberglas Corporation, a corporation of Delaware
Continuation of application Ser. No. 631,684, Dec. 31, 1956. This application Mar. 17, 1961, Ser. No. 96,569
11 Claims. (Cl. 65—3)

This invention relates to the production of coated fibers, and, more particularly, to an improved method for producing metal coated fibers or filaments of glass or other similar material, and to apparatus for practicing such improved method.

This application is a continuation of my application Serial Number 631,684, filed on December 31, 1956.

It has recently been discovered that fibers of glass, and other similar materials, recognized as outstanding reinforcement for many applications, can be adapted for use as reinforcement in materials with which they were not previously suitable. For example, glass or other fibers or filaments can be used to reinforce metals. Aluminum parts reinforced with glass fibers have substantially increased high temperature yield strengths, and can be used under temperature conditions which comparable aluminum parts, without the glass reinforcement, could not withstand.

It has been found to be extremely difficult to use glass fibers, either bare, or carrying a coating of a sizing material, to produce reinforced metal parts, or for other new reinforcing applications. It has been found, however, that metal coated fibers or filaments of glass or other similar material can be employed with much greater facility to reinforce metals and certain other materials which have not previously been reinforced with glass filaments.

Numerous difficulties, however, have been encountered in attempting to apply metal coatings to filaments of glass or other similar material. For example, the coatings often do not adhere satisfactorily to the filaments, or some portions of the filaments are covered satisfactorily, while others remain bare.

The present invention is based upon the discovery that metal coatings can be applied with much greater facility to filaments of glass or other similar material if the filaments are first exposed to the vapors of certain materials, including volatile metal salts and volatile metals. The invention also contemplates apparatus for use in applying such vapors to filaments of glass or other material.

It is, therefore, an object of the invention to provide an improved method for applying metal coatings to filaments of glass or other fusible, fiberizable material.

It is a further object of the invention to provide an improved method for producing such metal coated filaments characterized by subjection of the filaments, prior to application of the metal coating, to the vapors of a suitable coating material.

It is a further object of the invention to provide apparatus for subjecting filaments of glass or other similar material to the action of a coating substance.

Other objects and advantages will be apparent from the description which follows, reference being had to the accompanying drawings, in which—

FIG. 1 is a partially schematic view in elevation showing apparatus for producing metal-coated filaments in accordance with the invention;

FIG. 2 is an enlarged view of a portion of FIG. 1 with certain parts of the apparatus shown in section to reveal structure;

FIG. 3 is a partially schematic view in vertical elevation representing apparatus similar to that of FIG. 1, but with the various parts arranged in different spatial relationships; and FIG. 4 is a view in vertical section showing apparatus in accordance with the invention for applying a liquid metal or other coating to a filament of glass or other similar material.

Referring now in more detail to the drawings, the apparatus shown in FIG. 1 comprises a glass melting tank 10 provided with a bushing 11 and a tip 12 through which molten glass or other fiberizable, fusible, vitreous material flows. The material flowing through the tip 12 is drawn into a filament 13 by means of a collet 14, which is driven in any suitable manner to attenuate the stream of molten material to a desired filament diameter. A gathering shoe 15 over which a plurality of filaments 13 are passed and collected into a strand is represented, as well as a traversing mechanism 16 for winding the resulting strand of filaments in a desired pattern on the collet 14. A coating apparatus indicated generally at 17 is shown surrounding the filament 13, at a level just below the bushing tip 12, and a metal applicator indicated generally at 18 is positioned below the coating apparatus 17.

As can be seen in FIG. 2, the coating apparatus 17 comprises a metal inner liner 19 which constitutes a confining means or container for coating material. A slot is provided in the bottom of the liner 19, and in other vertically aligned portions of the apparatus 17, to enable passage of the filament 13 through the central portion of the apparatus. Flow through the slot of coating material contained in the liner 19 is prevented by fine mesh screens 20 which are welded or clamped to the liner 19. A refractory insulating member 21 with heating elements 22 embedded therein is provided in the structure, positioned between the liner 19 and a metallic cover 23 for the coating apparatus 17. It will be noted that the filament 13, and, if desired, other filaments being drawn from other bushing tips behind the one represented, moves downwardly between the fine mesh screens 20, and is separated thereby from the interior of the confining means or container defined by the liner 19. If desired, the two parts of the apparatus can be separate, and movable towards and away from each other. In this case, when the two parts are in close proximity, the filaments 13 pass through a space or slot therebetween to be coated. Such a structure enables easy feeding of the filaments through the apparatus, and variation of the width of the space or slot.

In operation, a desired coating material is supplied to the coating apparatus, and heated to a desired temperature by means of the elements 22, which can be electrical resistance elements, for example. The coating composition employed must be one which can be vaporized by heat at practical operating temperatures. Aluminum chloride is a specific example of such a coating composition. Aluminum chloride sublimes at temperatures below 200° C.; vapors thereof pass through the fine mesh screens 20 and contact the filament 13 as it is advanced between the screens. Zinc, cadmium and magnesium are volatile metals which can be vaporized through the screens 20 to provide a first metal or metal oxide deposit on the filaments 13, prior to application of a metal coating thereto from the applicator 18.

Aluminum and other salts are known to be capable of reaction with glass. It is believed that such reaction involves, in the case of aluminum chloride, the formation of an Al—O—Ca bond, for example, so that the aluminum is chemically attached to the glass surface. The resulting chemical structure is represented in the following formula:

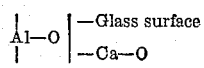

It will observed that two of the aluminum valences are represented as being free. This is probably not an accurate representation, but is intended to indicate principally that these valences are not necessarily satisfied by chlorine, as in aluminum chloride. For example, one or both of the valences can be satisfied by hydroxyl or oxygen; either the hydroxyl or the oxygen can be exterior of the glass, or the oxygen can constitute bridges between the aluminum and a constituent of the glass. It is believed that the precise chemical structure, apart from that represented in the above formula, is relatively unimportant, because it is the aluminum-containing or other coating, chemically linked to the glass, which facilitates application of a metal coating thereto by increasing the wettability of the glass. The coating which is produced will be a metal oxide in many cases.

It will be appreciated that vaporizable salts other than aluminum chloride can be employed in a similar manner. For example, $SbCl_3$, $BiCl_3$, $CdCl_2$, $CrO_2Cl_2$, $SnCl_2$, $ZnCl_2$, $ZrCl_4$ and $FeCl_3$, as well as other vaporizable coating materials, preferably as in the case of the indicated salts, reactive with glass at elevated temperatures. In the case of some such coating materials the screens 20 must be impervious thereto, when in a liquid state. For example, zinc chloride melts at 262° C., and boils at 732° C., so that molten zinc chloride must be retained by the screens when this coating material is employed. A relatively fine mesh screen is, therefore, required, the degree of fineness depending upon the liquid head, the viscosity of the molten zinc chloride, and the screening or other pervious material used.

The specific metal applicator 18 shown in FIG. 2 is enclosed within a metal sheet 25 lined with a plurality of removable insulating sections 26. Heating elements 27 are embedded in ceramic blocks 28 positioned interiorly of the ceramic lining members 26, and metal innerliners 29 separate the ceramic pieces 28 from a ceramic container 30 for molten metal. An opening 31 in the container 30 communicates with a passage through an insert tip 32 through which molten metal can flow from the receptacle 30. The opening in the tip is of such size that, at the temperature maintained by the heating elements 27, the metal flows relatively slowly therethrough and forms a globule at the outer extremity thereof, through which the filament 13 is drawn to apply the metal coating.

It is common practice in producing filaments of glass or other fusible, fiberizable, vitreous material to employ a special platinum alloy for the bushing tip 12. It is advantageous to prevent or minimize contact between such platinum alloys and gaseous metal salts, in order to avoid the possibility of forming a relatively low melting platinum alloy. When the bushing tip 12 is made of such an alloy, contact between it and the gaseous metal salts can be minimized by inducing a flow of gases away from the bushing tip. Also, various base metal bushing tips can be employed, or even certain refractory materials can be formed into tips which will operate satisfactorily. Apparatus shown in FIG. 3 is generally similar to that of FIG. 1 except that the filament 13 is drawn horizontally from the bushing tip 12, which is positioned on a horizontal axis rather than on a vertical axis, at the lower extremity of a melting furnace 35. This arrangement facilitates the prevention or minimization of contact between gaseous metal salts and the bushing tip. As in the apparatus of FIG. 1, the filament 13 is drawn by the collet 14 through an atmosphere containing a coating composition, which atmosphere is established by the apparatus 17, and then through a globule of molten metal from the applicator 18.

As is shown in FIG. 4, apparatus similar to the coating apparatus 17 can be employed as a metal applicator. The apparatus of FIG. 4 comprises a container composed of a metal innerliner 36, a refractory insulating portion 37 with heating elements 38 embedded therein, a metal coater sheel 39, and a pervious member 40, which can be a fine mesh screen, and which is disposed in one wall of the container, presenting a convex surface to a filament drawn therealong. The openings in the pervious member 40 are of such size that molten metal oozes therethrough from the interior of the applicator so that a filament 13 can be drawn through the body of molten metal on the exterior of the pervious member. This applicator can be substituted for the applicator 18 in practicing the method of the invention, or can be substituted for other metal applicators in different metal coating methods.

In addition to inorganic coatings, such as volatile salts and metals, organic coatings can also be applied to filaments of glass or the like from the apparatus according to the invention. For example, stearic acid, phthalic acid, maleic acid and other volatile organic materials can be so applied. In some instances such materials may react with the hot glass surface to produce a metal soap, while in others they may merely produce an unreacted coating.

It will be apparent that various changes and modifications can be made from the specific details discussed herein and shown in the attached drawings without departing from the spirit and scope of the attached claims.

I claim:

1. Apparatus for applying a coating material in the vapor state to freshly formed viterous filaments comprising applicator means confining a supply of vaporizable coating material in liquid form, said applicator means including spaced opposed interior members bounding a coating zone open to the passage of filaments therethrough, which members are impervious to the coating material in a liquid condition but pervious thereto when in a vapor state, and means for heating said confined coating material to vapor evolving condition to form a coating atmosphere thereof in said coating zone.

2. Apparatus for applying a coating material in a vapor state to vitreous fibers comprising applicator means confining a supply of vaporizable coating material in liquid form, said applicator means including spaced opposed interior members in confining contact with said coating material and bounding a coating zone open to the passage of filaments therethrough, which members are impervious to said coating material in a liquid condition but pervious to vapors evolved therefrom, and means for heating said confined coating material to vapor evolving condition to form a coating atmosphere thereof in said coating zone.

3. Apparatus for applying a coating material in a vapor state to vitreous fibers comprising applicator means confining a supply of vaporizable coating material in liquid condition, said applicator means including spaced opposed interior screen members in confining contact with said coating material in liquid form and bounding a coating zone open to the passage of filaments therethrough, which screen members are impervious to said liquid coating material but pervious to vapors evolved therefrom, and means for heating said confined liquid coating material to vapor evolving condition to form a coating atmosphere thereof in said coating zone.

4. Apparatus for applying a coating in the vapor state to freshly formed vitreous filaments comprising means providing a plurality of filaments, means for linearly advancing said filaments, applicator means confining a supply of vaporizable liquid coating material, means for heating said liquid material to evolve vapors therefrom, said applicator means including a vapor pervious member transverse to and immediately adjacent the advancing filaments, said vapor pervious member adapted to confine said coating material in a liquid condition yet being sufficiently porous to pass vapors therefrom into coating contact with the immediately adjacent advancing filaments.

5. Apparatus for applying a coating to freshly formed filaments of vitreous material comprising means confining a body of a liquid coating substance, said confining means including a porous wall portion which is pervious to allow diffusion of said liquid coating substance therethrough but is effective to contain the body against free flow therefrom, means for heating the body of coating substance contained within said confining means, and means for drawing the filament to be coated adjacent the exterior of said porous wall portion in contact with the coating substance diffused through and retained at said porous wall portion.

6. A continuous method for applying a coating substance to freshly formed vitreous filaments comprising flowing streams of vitreous filament forming material from a molten source thereof, attenuating said streams into filaments, establishing in a zone where said filaments are hot from the heat of their formation a contained heat vaporizable coating liquid having a surface layer thereof in confined but exposed engagement with a vapor pervious liquid impervious screen adjacent the path of advancement of said filaments, heating the body of said liquid to continuously evolve vapors from the screen-confined surface layer and to diffuse them through said screen, continuously linearly advancing said filaments still hot with the heat of their formation directly adjacent said screen-confined surface layer in coating association with the vapors diffused therefrom, and concomitantly heating said screen-confined surface layer with heat supplied by said hot filaments to promote the evolution and diffusion of vapors therefrom.

7. A continuous method for applying a coating substance to freshly formed vitreous filaments comprising flowing streams of vitreous material from a molten source thereof, attenuating said streams into filaments, establishing in a zone where said filaments are hot from the heat of their formation a contained heat vaporizable coating substance in a liquid condition having surface layers thereof in confined but exposed engagement with vapor pervious liquid impervious screens in opposed spaced relation bounding the path of advancement of said filaments, heating the liquid to continuously evolve vapors from said surface layers and diffusing them through said screen members into the space between said screens, continuously linearly advancing said filaments hot with the heat of their formation through said space and adjacent said screen-confined surface layers in coating association with the vapors diffused therein, and concomitantly heating said screen-confined surface layers with heat supplied by said hot filaments to promote the evolution and diffusion of the vapors therefrom.

8. A method for applying a coating substance to vitreous filaments comprising establishing a contained heat vaporizable coating liquid having a surface layer in confined but exposed engagement with a vapor pervious liquid impervious screen, heating said liquid to continuously evolve vapors from said surface layer and to diffuse them through said screen, continuously linearly advancing hot filaments of vitreous material directly adjacent the screen-confined surface layer in coating association with the vapors diffused therefrom, and concomitantly heating said screen-confined surface layer with heat supplied by said hot filaments to promote the evolution and diffusion of vapors therefrom.

9. In a continuous method for applying a metal coating to a filament of a fusible, fiberizable, vitreous material which includes the step of continuously drawing the filament at high velocity through a bath of molten metal, the improvement which comprises confining a body of aluminum chloride in a zone, a portion of which zone comprises a vapor permeable screen, heating the aluminum chloride to a temperature sufficiently high that vapors thereof are evolved and diffused through said screen whereby an atmosphere composed to a substantial extent of aluminum chloride vapors is established and maintained exteriorly of said confined zone, pulling the filament, in a heated, freshly fiberized condition, through said atmosphere to condition the surface of said filament and thereby to facilitate the application of a metal coating thereto, and then pulling said conditioned filament directly into the metal coating bath whereby a substantially uniform, tightly adherent metal coating is produced thereon.

10. Apparatus subjecting fibers to contact with vapors of vaporizable liquid material in close adjacency to their forming zone comprising a porous vapor supply surface oriented for disposition in close generally parallel adjacency to the path of linearly moving fibers, a container for holding a quantity of vaporizable liquid of which said vapor supply surface forms a wall portion, said porous surface being in confining contact with said liquid and being of sufficiently fine porosity to retain said vaporizable liquid against free flow but sufficiently porous to permit release of vapors of said liquid therefrom to said fibers.

11. Apparatus for forming and subjecting fibers of heat softenable material to contact with vapors of heat vaporizable liquid material comprising feeder means associated with a molten source of heat softenable material supplying streams of said material, means for attenuating said streams into filaments, a vapor supply source comprising a reservoir confining a supply of vaporizable liquid, said reservoir including a vapor supply portion comprising a porous wall disposed adjacent the path of said filaments in a zone where said filaments are still hot with the heat of their formation, said porous wall being sufficiently fine in porosity to hold said liquid from freely flowing yet being sufficiently permeable to permit vapors of said liquid to be evolved therefrom, said porous wall being located sufficiently close to the said filaments to cause heat of said filaments to heat said liquid in contact therewith to promote the vaporization of the portion of said liquid in contact with said porous wall.

References Cited in the file of this patent
UNITED STATES PATENTS

| | | |
|---|---|---|
| 2,577,936 | Waggoner | Dec. 11, 1951 |
| 2,699,415 | Nachtman | Jan. 11, 1955 |
| 2,749,255 | Nack et al. | June 5, 1956 |
| 2,767,519 | Bjorksten | Oct. 23, 1956 |
| 2,818,831 | Vine | Jan. 7, 1958 |
| 2,863,176 | Labino | Dec. 9, 1958 |
| 2,887,088 | Nack | May 19, 1959 |
| 2,939,761 | Stein | June 7, 1960 |